Oct. 10, 1950 H. N. LAPETINA 2,525,688
BLOWOUT PATCH
Filed Jan. 28, 1947

INVENTOR.
HERBERT N. LAPETINA
BY Victor J. Evans & Co.
ATTORNEYS

Patented Oct. 10, 1950

2,525,688

UNITED STATES PATENT OFFICE 2,525,688

BLOWOUT PATCH

Herbert N. Lapetina, Norfolk, Va.

Application January 28, 1947, Serial No. 724,785

1 Claim. (Cl. 152—367)

This invention relates to a blow out patch for pneumatic tires, and the primary object of the invention is to provide a device of this character that is provided with inner and outer sheets of gummed fabric, having a sheet of pliable metal interposed therebetween to prevent bulging of the fabric, due to the inner press of the tube within the pneumatic tire.

With the above and other objects and advantages in view, the invention consists of the novel details of construction, arrangement and combination of parts more fully hereinafter described, claimed and illustrated in the accompanying drawing in which:

Figure 1:
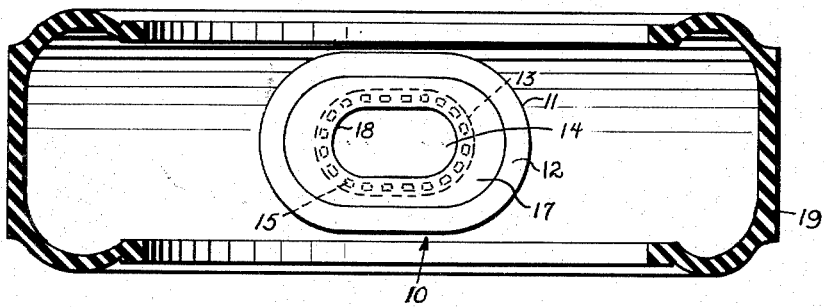
Figure 1 is an elevational view of an embodiment of the invention in place within the carcass of a pneumatic tire.
Figure 2:
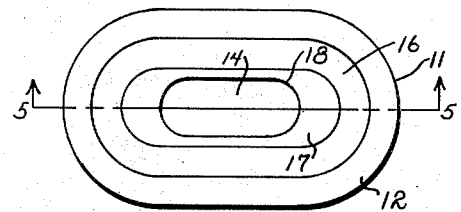
Figure 2 is a plan view of the device, per se.
Figure 3:
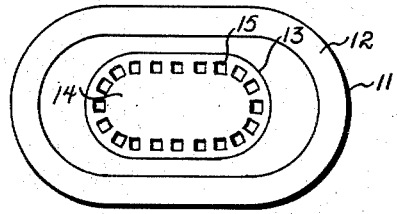
Figure 3 is a plan view with the top layer of fabric removed, showing the metal insert.
Figure 4:
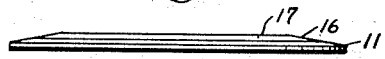
Figure 4 is a peripheral edge view of the device.
Figure 5:
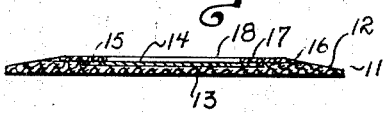
Figure 5 is a sectional view on the line 5—5 of Figure 2.

Referring more in detail to the drawing, the reference numeral 10 designates the blow out patch embodying the invention, which comprises the lower elliptical shaped layer of fabric 11 of the type used in making blow out patches. The marginal outer edge of the layer 11 is provided with a downwardly inclined bevel 12, and a centrally located elliptical shaped recess 13. Placed in the recess 13 is a similarly shaped piece of mesh wire or soft pliable metal 14 which is provided with a row of perforations 15 adjacent the outer marginal edge thereof.

The plate 14 is secured in the recess 13 by an adhesive, and by stitching, which passes through the perforations 15 in the plate 14.

Secured to the first layer 11 by a suitable adhesive is a top layer of fabric which is elliptical in shape, having a downwardly inclined bevelled marginal edge 16, a flat portion 17 in which is positioned a centrally located elliptical shaped opening 18.

In use, the bottom of the layer 11 is covered with a suitable adhesive, and the patch is placed in the tire carcass 19 with the adhesive side next to the carcass, and the adhesive will hold the patch in position to repair any break in the carcass, as shown in Figure 1.

The bevelled edges of the layers 11 and 16 will eliminate any rough edges to cause bumping of the tire during motion thereof, and the metal insert will prevent the patch from bulging outwardly through the break in the carcass, due to the pressure of the tube in the tire.

There has thus been provided a simple, efficient and durable tire patch which, it is believed, will accomplish the object of the invention, and it is believed that from the foregoing description, the structure and operation of the invention will be apparent to those skilled in the art. It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, for use with pneumatic tires, comprising top and bottom outer layers of fabric with an inner layer of soft pliable metal intermediate of said outer layers, the layers being secured in position by a suitable adhesive, said bottom outer layer being elliptical in shape and having an outwardly inclined bevelled outer edge and a centrally located elliptical shaped recess to receive the similarly shaped inner metal layer, said metal layer being provided with perforations adjacent the marginal edge thereof whereby stitching may pass through said perforations to secure said layer to said bottom layer, and said top outer layer being elliptical in shape and provided with an outwardly bevelled outer edge forming a continuation of the bevelled edge of the bottom outer layer, and a flat portion inwardly of the bevel having a centrally located elliptical shaped opening therein, for the lightening thereof, and said bottom outer layer being provided with a coating of adhesive on the back thereof, whereby said bottom outer layer is secured to the inner wall of a tire carcass.

HERBERT N. LAPETINA.

REFERENCES CITED

The following references are of record in the file of this patent:

UNITED STATES PATENTS

| Number | Name | Date |
| --- | --- | --- |
| Re. 17,859 | Dunlap | Nov. 11, 1930 |
| 520,643 | Hoffman | May 29, 1894 |
| 601,327 | Stevenson | Mar. 29, 1898 |
| 852,716 | Hall | May 7, 1907 |
| 1,269,124 | Smith | June 11, 1918 |
| 1,320,708 | Pianko | Nov. 4, 1919 |
| 1,462,628 | Thoresen et al. | July 24, 1923 |